United States Patent [19]

Cook

[11] 4,421,052
[45] Dec. 20, 1983

[54] TIRE PRESSURE SIGNALLING DEVICE
[75] Inventor: Edward J. Cook, South Hamilton, Mass.
[73] Assignee: Safety Research & Engineering Corp., North Reading, Mass.
[21] Appl. No.: 157,897
[22] Filed: Jun. 9, 1980
[51] Int. Cl.³ .............................................. B60C 23/04
[52] U.S. Cl. .................................. 116/34 R; 116/70; 116/137 R; 340/58
[58] Field of Search ............. 116/34 R, 137 A, 137 R, 116/70; 340/58; 73/146.8, 146.5

[56] References Cited
U.S. PATENT DOCUMENTS

| 983,837 | 2/1911 | Quirin | 116/34 R |
|---|---|---|---|
| 2,709,983 | 6/1955 | Divietro | 116/34 R |
| 3,276,417 | 10/1966 | Flowers | 116/34 R |
| 3,489,998 | 1/1970 | O'Neal | 116/34 R |
| 3,738,308 | 6/1973 | Barabino | 340/58 |
| 3,890,595 | 6/1975 | Barabino | 340/58 |
| 3,934,223 | 1/1976 | Barabino | 116/34 R |
| 4,031,845 | 6/1977 | Cook | 116/137 R |
| 4,067,376 | 1/1978 | Barabino | 116/34 R |
| 4,103,282 | 7/1978 | Cook | 340/58 |
| 4,186,377 | 1/1980 | Barabino | 340/58 |

Primary Examiner—Anthony V. Ciarlante
Assistant Examiner—Denis E. Corr
Attorney, Agent, or Firm—Morse, Altman, Oates & Dacey

[57] ABSTRACT

Devices are disclosed for use in generating an acoustical warning signal in the event of an abnormal pressure in a pneumatic tire. A spring-loaded piston is mounted for reciprocation in a cylindrical chamber along an axis perpendicular to the radius of the tire for substantially eliminating the effects of centrifugal force on the operation of the device. The piston maintains the device closed until such time as the tire pressure drops below a predetermined limit at which point a small sampling of air is released into a whistle which produces a coded acoustical signal detected by an acoustical transducer mounted on the vehicle. The transducer converts the acoustical signal into an electrical signal which is processed and used to actuate an alarm for warning the driver. Cap seals are disclosed which protect the whistle from water dirt, etc.

5 Claims, 6 Drawing Figures

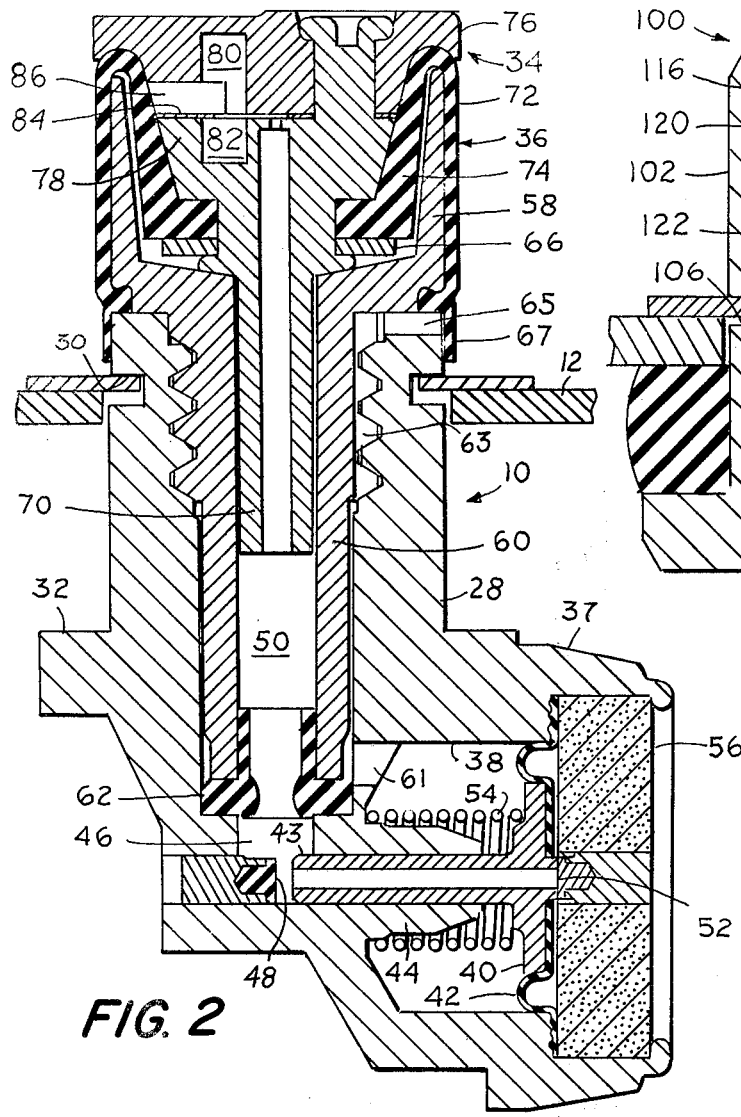
FIG. 2
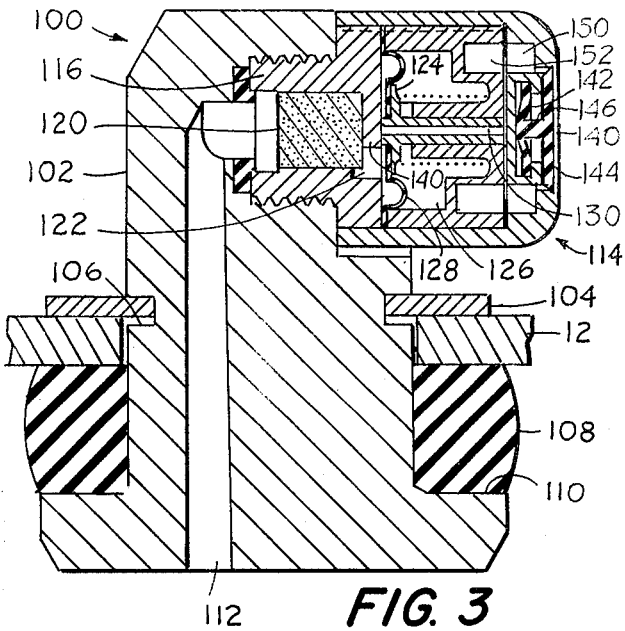
FIG. 3
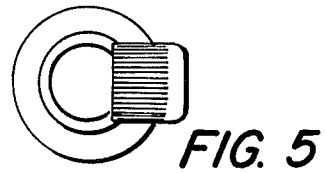
FIG. 5
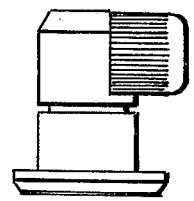
FIG. 6
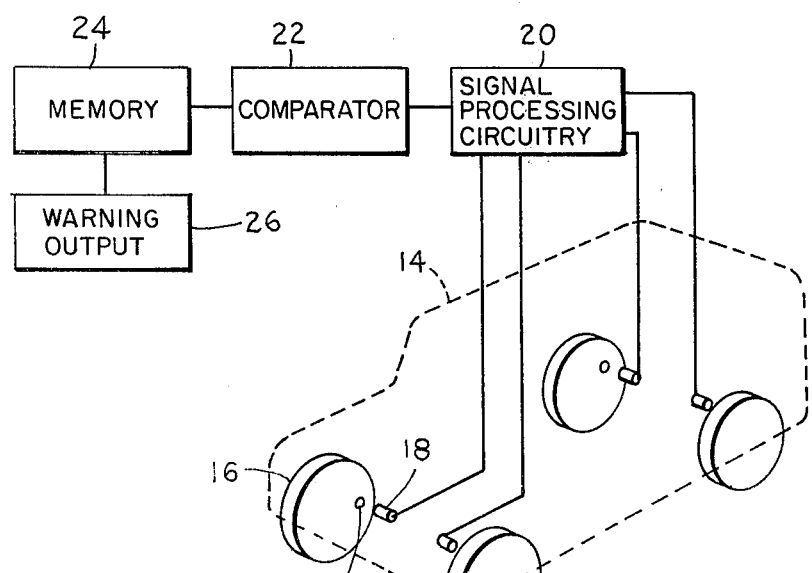
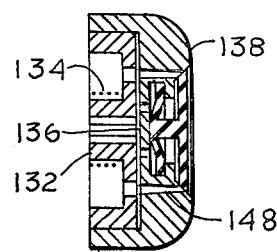
FIG. 4

TIRE PRESSURE SIGNALLING DEVICE

BACKGROUND OF THE INVENTION

1. Field of the Invention

This invention relates generally to tire pressure warning devices and more particularly is directed towards a new and improved acoustical signal generating device for use with a pneumatic tire including improved cap seals and whistle construction as well as improved piston configuration.

2. Description of the Prior Art

In commonly assigned U.S. Pat. Nos. 3,489,998, 3,890,595 3,738,308, 4,031,845, 3,934,223, 4,103,282 and 4,186,377 there are disclosed tire pressure warning systems and components thereof adapted to monitor the air pressure in a pneumatic tire and to warn the operator in the event of abnormal tire pressure condition. In a typical embodiment of the system, an acoustical signal generating device is mounted on each wheel of a vehicle such as a passenger car and, in the event that the air pressure in any one or more of the tires drops below a predetermined limit, an acoustical signal is then picked up by a microphone mounted on the chassis of the vehicle. The microphone converts the acoustical signal to an electrical signal which is then processed, stored in memory if the vehicle is parked for overnight, for example, and then delivered to a warning device such as a light or alarm, typically on the dashboard of the car so that the driver will be alerted to the tire pressure condition.

It is an object of the present invention to provide improvements in the acoustical signal generating device mounted on each wheel. A more specific object of the invention is to provide an acoustical signal generating device which is unaffected by the centrifugal forces developed in the tire when the vehicle is in motion. A further object of this invention is to provide improved cap seals for use with acoustical tire pressure warning devices.

SUMMARY OF THE INVENTION

This invention features an acoustical signal generating device for use with a tire pressure warning system, comprising a valve body mountable to the rim of the wheel on which a pneumatic tire is mounted, the valve body having an opening to the interior of the tire. The device is formed with a cylindrical chamber the longitudinal axis of which is perpendicular to the radius of the wheel and a piston is mounted for movement in the chamber along said axis. The piston is sealed to the cylinder walls and is formed with a longitudinal passage which is normally closed by the normal position of the piston. In the event of a low tire pressure condition, the piston will move from one closed position to an open position to release a sampling of air and then move again to a closed position. During the time that the passage is open a flow of air is delivered to an acoustical signal generating device or whistle which is normally protected by a resilient cap seal. The cap seal under air pressure is adapted to open, exposing the acoustical generator and allowing an acoustical signal to be transmitted therefrom. The cap reseals itself at the end of the sampling period.

The acoustical signal generating device also features an improved double cavity slit nozzle configuration adapted to produce an acoustically coded signal whereby the acoustical signal will be distinct from background noise.

BRIEF DESCRIPTION OF THE DRAWINGS

FIG. 1 is a schematic diagram of a tire pressure warning system with which the signaling devices made according to the invention may be utilized.

FIG. 2 is a sectional view in side elevation showing a tire pressure warning device made according to the invention, FIG. 3 is a view similar to FIG. 2 but showing a modification thereof, FIG. 4 is a detailed sectional view of the acoustical head assembly of FIG. 3 but along a cross-sectional line 90° to that of FIG. 3.

FIG. 5 is a top plan view of the FIG. 3 device, and,

FIG. 6 is a view in side elevation thereof.

DETAILED DESCRIPTION OF THE PREFERRED EMBODIMENTS

Referring now to the drawings and to FIG. 1 in particular, there is illustrated in schematic form a tire pressure warning system which may utilize a device made according to the invention. The system generally comprises a pressure-responsive acoustical signal generating device 10 mounted to each wheel 12 of a vehicle 14 such as an automobile, each wheel having mounted thereon a pneumatic tire 16. The device 10 rotates with the wheel 12 and, in the event of a low tire pressure condition, the device produces a coded acoustical signal which is detected by a transducer such as a microphone 18 mounted to the vehicle chassis, typically in a wheel well, for example. Each microphone 18 is adapted to detect an acoustic signal generated by the device 10 and convert it into an electrical signal which is fed into a signal processing unit 20 adapted to perform various signal processing operations such as detection and filtering for detecting only the coded signal while rejecting all spurious signals. The processed signal is then fed through a comparator 22, then through a memory device 24 which serves to store any warning signal if such warning signal is generated while the ignition system is off, as when the car is parked. If the car is operational, the signal will pass directly through to a warning output device 26 such as a light on the dashboard, a buzzer or a combination thereof, for example. If the signal is stored in memory it will be released to the warning output device as soon as the ignition system is turned on so that the operator will know immediately upon starting the vehicle that loss of tire pressure has occured during his absence.

The device 10 is shown in detail in FIG. 2 and is comprised of a body portion 28 mountable to the rim of the wheel 12. Typically, each wheel is formed with an opening similar to that provided for the stem of the air filling valve standard on each wheel. The upper end of the body portion is inserted through the opening from inside the wheel and is retained in position by means of a snap ring, or the like, on the outside of the wheel engaging the outer edge of the wheel around the wheel opening and an annular groove 30 in the upper portion of the body 28. A resilient bushing is compressed between the inner face of the wheel around the opening and a lower shoulder 32 to provide an air-tight seal therewith. At the upper end of the valve body 28 is a movably mounted whistle assembly 34 and connected to it by means of a resilient cap 36. The upper end of the device, including the cap and whistle assembly are on the outside of the wheel when the device is mounted in place.

The lower part of the body portion 28 is located within the wheel cavity and includes an offset portion 37 oriented perpendicularly to the length of the device and is formed with a cylindrical chamber 38, the longitudinal axis of which is perpendicular to the radius of the wheel when the device is mounted to the wheel. Mounted in the chamber 38 is a piston 40 disposed for movement along the axis of the chamber and sealed to the chamber walls by means of a rolling seal diaphragm 42 which allows the piston to move with substantially no friction while providing an air-tight seal therewith. The piston is formed with an elongated tubular stem 43 slidably mounted to a guideway portion 44 which opens into an internal passageway 46. The left hand end of the stem 43 in normal operating position is closed against a resilient seat 48 to prevent the loss of any tire pressure. The passage 46 communicates with a passage 50 which in turn communicates with the whistle assembly 34 at the end of a sampling period. The right hand end of the piston is adapted to close against a valve seat 52 mounted centrally at the open end of the cylinder chamber 38. A coil spring 54 is compressed between the left hand face of the piston and the inner wall on the chamber 38.

In practice, assuming normal operating tire pressure within the tire, the pressure of the air will be sufficient to force the piston 40 to the left so that the left hand end of the stem 43 closes against the seat 48 preventing loss of air. If tire pressure drops then the force of the spring 54 will be sufficient to overcome tire pressure remaining and the left hand end of the stem 43 will move away from the seat 48, opening up an air passage extending from inside the tire, through the passage in the stem 43, up through the passage 50, into the whistle assembly 34, causing the whistle assembly to produce an acoustical signal. As tire pressure continues to drop the piston will move to the right until it closes against the seat 52, thereby stopping further loss of air through the device 10. Typically, the sampling time is quite short being on the order of a few seconds or so, so that no significant amount of air is lost from the tire as a result of the air sampling operation.

An air filter 56 is mounted across the open end of the chamber 38 on the right hand side of the piston to prevent the entry of any foreign matter into the device which might interfere with the operation of the device.

The upper portion of the device includes a cup 58 formed with a downwardly extending threaded tubular stem 60, the lower end of which bears against an annular bushing 62 to form a seal with the valve body. A small vent passage is formed between the outer wall of the stem 60 and the inner wall of the body portion to provide balanced air pressure on the inner side of the piston. The vent passage extends from an opening 61 along a vertical groove 63 running lengthwise along the stem out through a vent port 65 normally covered by a flap 67 on the cap 36.

The cup 58 is formed with a central passage to receive a tubular lower stem 70 of the whistle assembly which stem is formed with a passage providing communication between the chamber 50 and the whistle portion of the whistle assembly 34.

Surrounding the cup 58 is the cap 36 which is fabricated from a resilient material such as neoprene rubber, or the like, and is formed with an outer annular skirt 72 covering the outer cylindrical surface of the cup and a re-entrant tapered conical portion 74, the lower end of which is secured to the whistle assembly by means of annular retainer 66.

The whistle assembly 34 includes top and bottom members 76 and 78, respectively, the bottom portion 78 including the downwardly extending stem 70 formed with a central air passage. The top and bottom members are formed with a pair of opposing cavities 80 and 82 with their axes oriented perpendicular to the plane of a whistle disc 84 sandwiched between the top and bottom members 76 and 78. The compressional waves set up in the cavities during oscillation move at right angles to the gas stream from the slit nozzles. In this configuration the gas and acoustic energy exit through an aperture 86 in the side wall of each cavity. The advantage resulting from this configuration is that the location of the whistle disc interaction edge is not a primary determinant of the oscillation frequency and the dimensional latitude in whistle disc assembly is greatly improved. The overall cavity length in this configuration sets the frequency; and to ensure tracking between the two cavities and a stable difference frequency, each cavity is formed by two approximately equal length sections molded into two plastic pieces between which the whistle disc is sandwiched. In this way, any shringkage which occurs in the molding of either part affect both cavities equally.

The approximate cavity length for 40 Khz operation is $\lambda/2 = 0.164''$. However, to achieve the desired frequency difference between cavities of $\Delta f = 2$ Khz, the overall length of the two cavities is made to differ by $$\Delta l = 0.164 \frac{\Delta f}{f} = 0.008''.$$

The function of the protective cap 36 is to seal the acoustic generator exit ports 86 when the device is not signaling. To resist water penetration in the sealed condition, the material for the protective cap and for the contacting surfaces of the acoustic generator should be non-wetting. Silicon rubber satisfies this requirement and provide a durable all-weather operational capability.

The protective cap relies on air pressure to affect a separation between the cap and the acoustic generator, and on the elastomeric properties of the cap to restore the seal once air pressure is removed. During a sampling period of the device, air is released into the upper portion of the body and pressurizes the region below the acoustic generator and cap assembly. This air pressure acts to lift the whistle assembly from its closed and seated position. In so doing, the re-entrant wall of the cap is unrolled off the tapered side of the conical-shaped upper portion of the whistle assembly and the exit ports 86 are exposed. Since the re-entrant wall of the cap is tapered in cross-section, this wall exerts a rapidly increasing force to oppose the lifting action of the air pressure on the acoustic generator and, once the air pressure is removed, the cap is rapidly re-seated as the re-entrant wall returns to its original position. The projection of the cap is therefore stable and there exists an equilibrium position for the cap over the full range of upper sensor body air pressure to be encountered in actual use. By way of example, in a working embodiment of the device the acoustic generator projection begins at an upper sensor body air pressure of 6 psig, reaches the desired exit port clearing position at 10 psig and is still stable though further extended at 30 psig, the maximum exit pressure applied. Typically, devices have been designed to yield a nominal upper body pressure of 12 psig at the center of the sampling range where maximum flow is reached.

Referring now to FIGS. 3 through 6, there is illustrated a modification of the invention and, in this embodiment, an acoustical signal generating device is generally indicated by the reference character 100. The device is generally organized about a body portion 102 mountable to the rim of a wheel 12 by means of a snap ring 104 engaged with an annular groove 106 formed about the body with a bushing 108 compressed between the inner face of the rim 12 and an inner shoulder 110 formed on the lower portion of the body 102. The body portion is formed with a air passage 112 extending radially into the tire cavity and extends up through the body 102 to the upper portion thereof where it forms a right angle bend into a modular head assembly 114. The modular head assembly is formed with a threaded neck portion 116 screwed into a tapped socket of the body 102 along an axis perpendicular to the radius of the wheel. The threaded neck is formed with an axial passage in which is mounted a filter 120. The passage extends into an outlet 122 on the left hand side of a piston 124 which is mounted for reciprocation in a cylindrical chamber 126, the axes of both of which are perpendicular to the radius of the wheel in order to eliminate the effects of centrifugal force when the wheel is rotating.

The piston 124 is sealed to the walls of the cylinder by means of a rolling seal diaphragm 128 similar to that of the principal embodiment. The piston is formed with a tubular stem 130 slidably extending through a tubular guideway 132 about which is mounted a coil spring 134. The right hand end of the tubular stem 130 seats against a right hand wall 136 during normal operation of the tire. In this position no air can leak out of the device. In the event of a drop in tire pressure, the spring 134 will move the piston 124 to the left, opening up the passage through the stem and causing air to be released to an acoustical whistling device 138. Air will be released during a sampling period until the piston moves fully to the left so as to seat against a left hand wall 140, again closing the device from further loss of air through it. When the piston is in the open position, air releases through openings in the wall 136 into a chamber on the inner side of sealing cap 140. The cap 140 is formed with two disc-shaped portions 142 and 144 joined by a connecting stem 146. The inner disc portion 142 is initially concave and is tapered in cross-section so that a stable cap position is achieved over a wide range of cap inflation chamber pressures. As is the case with the principal embodiment 12 psig is the the nominal inflation chamber pressure at maximum flow.

When air is released into the chamber 136, the cap will be biased to the right so that the outer disc 144 will unseat from its closed position to open port 148 communicating with acoustical chambers 150 and 152 similar to those of the principal embodiment. Upon completion of the air sampling operation and the acoustical signal, the piston will move to the left-hand closed position, terminating air flow into the chamber 136 and the cap will reseat itself, again sealing off the port 148.

In the FIG. 3 embodiment, the piston makes a hard seal with the end walls of the cavity. In order to achieve proper operation of the hard sealing feature, it is necessary that highly smooth and parallel end surfaces be provided on the piston. Precise alignment of the body surfaces with the piston ends is also required and some degree of accommodation on the body sealing surfaces to the piston end faces is required. The first requirement can be met by precision piston fabrication processes, while the second requirement can be met by the stacked assembly arrangement shown in FIG. 3 which allows the seal surfaces to be self-aligned by the piston retainer. The final requirement can be achieved by using a teflon-like additive in the plastic selected for the injection molded body parts. This will yield a skin on the seal surfaces that will have sufficient plasticity to accommodate microscopic imperfections in the piston ends.

In the principal embodiment of the FIG. 2 device, most of the sensor pressure drop is across the seals. Thus, sensor flow and sampling range are interdependent. With the hard seal design, a much greater clearance between the seals and the piston is possible during the signalling period for a given total piston travel from opening pressure to closing pressure. To take advantage of this improved clearance and relaxed production tolerances, an alternative flow method is required. In the FIG. 3 embodiment flow control is achieved by the diameter and length of the piston bore. Sensor flow and sensor sampling range are now completely independent.

By using the module configuration of FIG. 3 embodiment, a universal unit is provided since the basic module can be used either for rim-mounted or valve-mounted application by means of an appropriate adapter. In the rim-mounted application, the module can be changed without the need to break down the tire. Also, by removing the right angle bend between the valve and the acoustic components on the sensor, as in the principal embodiment, a significant reduction in sensor parts, complexity and number can be achieved, thereby facilitating production and assembly thereof.

While the invention has been described with particular reference to the illustrated embodiments, numerous modifications thereto will appear to those skilled in the art.

Having thus described the invention, what I claim and desire to obtain by Letters Patent of the United States is:

1. A tire pressure warning device for use with a wheel having a pneumatic tire mounted thereon, comprising
   (a) a body mountable to said wheel and formed with a cylindrical chamber the axis of which is perpendicular to the radius of said wheel when mounted thereto,
   (b) said body mountable to said wheel with at least a portion thereof exterior to said wheel,
   (c) a piston mounted to said chamber for movement along said axis and responsive to pressure in said tire,
   (d) acoustical signal generating means in said body and communicating with said exterior portion of said body,
   (e) conduit means in said device forming an air flow passage from the interior of said tire to said signal generating means, one portion of said passage being generally parallel to said axis and another portion being perpendicular thereto,
   (f) said piston being operatively associated with said conduit means and adapted to close said passage at different tire pressure conditions and to open said passage at another operative position related to an abnormal tire pressure condition,
   (g) resilient means operatively associated with said piston and urging said piston into one of the closed positions thereof, (h) said acoustical signal generating means being formed with at least one outlet port in the exterior portion of said body for the emission of an acoustical signal therefrom, and, (i) a resilient cap mounted to said body, said cap including one portion fixed to said body and another portion movable with respect to said one portion and to said body, said other portion normally covering said outlet port and movable away from said port in response to the flow of air in said passage and returning to cover said port when said flow of air is stopped.

2. A tire pressure warning device for use with a wheel having a pneumatic tire mounted thereon, comprising (a) a body mountable to said wheel and formed with a cylindrical chamber the axis of which is perpendicular to the radius of said wheel when mounted thereto, (b) said body mountable to said wheel with at least a portion thereof exterior to said wheel, (c) a piston mounted in said chamber for movement along said axis and responsive to pressure in said tire, (d) acoustical signal generating means in said body and communicating with said exterior portion of said body, (e) conduit means in said device forming an air flow passage from the interior of said tire to said signal generating means, (f) said piston being operatively associated with said conduit means and adapted to close said passage at different operative positions related to different tire pressure conditions and to open said passage at another operative related to an abnormal tire pressure condition, (g) resilient means operatively associated with said piston and urging said piston into one of the closed positions thereof, (h) said acoustical signal generating means being formed with at least one outlet port in the exterior portion of said body for the emission of an acoustical signal therefrom, and, (i) a resilient cap mounted to said body, said cap having a relatively fixed portion and a relatively movable portion, said movable portion being tapered in cross-section and normally covering said outlet port, said cap being movable in response to the flow of air in said passage whereby said movable portion of said cap will uncover said port and will return to cover said port when said flow of air is stopped, said tapered cross-section providing increasing resistance to an increase in the displacement of said movable portion.

3. A tire pressure warning device according to claim 2 wherein said cap comprises an outer annular fixed portion mounted to the exterior portion of said body and re-entrant concentric conical movable portion the walls of which are tapered in cross-section, said conical portion connected to said generating means movably nested in said conical portion.

4. A tire pressure warning device according to claim 2 wherein said cap comprises a pair of spaced and generally parallel circular discs connected to one another, one of said discs being disposed outwardly of the other of said discs and in position to normally cover said port, said other disc being normally concave and tapered in cross-section to provide increasing resistance to and increase in displacement thereof, said other disc having one side thereof communicating with said conduit means and adapted to be displaced by the flow of air therethrough whereby said one disc will move to open said port and to close said port when said air flow is stopped.

5. A tire pressure warning system according to claim 2 wherein said generator is formed with a pair of oppositely facing acoustical cavities communicating with said port, and said conduit means and a thin member mounted therebetween providing an interaction edge to the flow of air thereagainst, the axes of said cavities being oriented perpendicularly to the plane of said member.

* * * * *